Feb. 17, 1953     J. REED     2,629,015
ELECTROMAGNETIC WAVE FILTERING DEVICE
Filed June 28, 1949
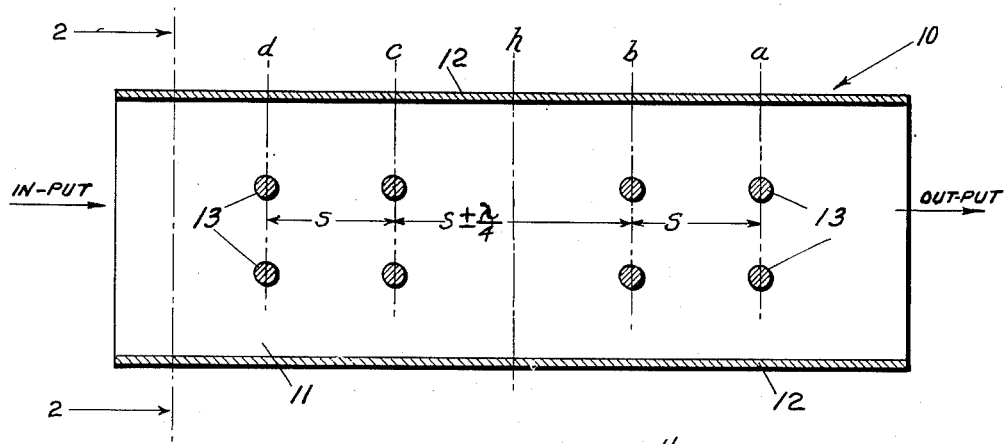
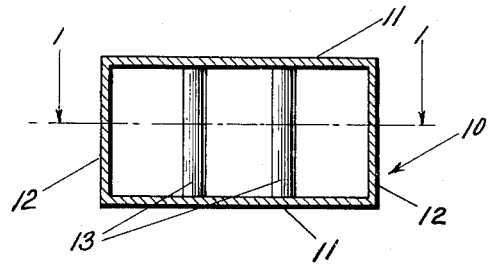
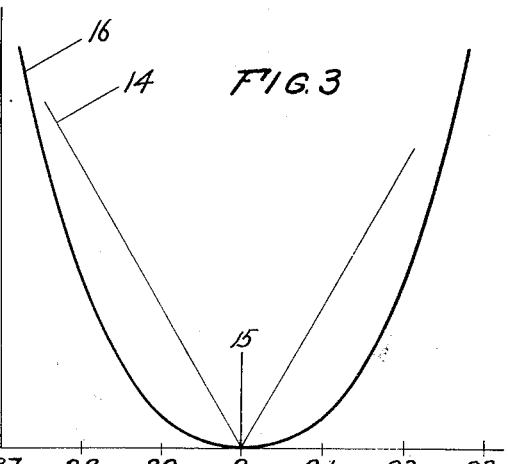
INVENTOR
JOHN REED
BY Elmer J. Gorn
ATTORNEY Patented Feb. 17, 1953

2,629,015

UNITED STATES PATENT OFFICE 2,629,015

ELECTROMAGNETIC WAVE FILTERING DEVICE

John Reed, Belmont, Mass., assignor to Raytheon Manufacturing Company, Newton, Mass., a corporation of Delaware Application June 28, 1949, Serial No. 101,707

2 Claims. (Cl. 178—44)

This application relates to frequency responsive filtering devices utilizing electrical waves, and more particularly to filters of the wave guide type operating in the microwave range.

In high-frequency filtering devices, of a type generally employed, discontinuities are placed at discrete intervals along a transmission line, the reflection of waves, traveling down the transmission line, by said discontinuities creating a filtering effect. Prior to applicant's invention it was generally believed that the frequency consciousness of the magnitude of the discontinuities did not affect the frequency response of the filter. Applicant, however, has discovered that this does affect the frequency response of the filter, and that the spacing between said discontinuities should be adjusted to compensate for different magnitudes of discontinuities in different filter design applications.

More particularly, in a band-pass filter of the type known as a two-stage filter wherein each stage comprises a pair of discontinuities, it has been discovered that, for critical coupling of the stages whereat a smooth band-pass characteristic curve is obtained, the spacing between the stages must vary as a function of the spacing between the discontinuities of each stage.

Applicant has discovered that the distance between the stages for a smooth band-pass characteristic should be different from the distance between the discontinuities of each stage by an amount equal to an odd number of quarter wave lengths at the operating frequency.

In addition, applicant has discovered that a suitable and highly desirable structure, for a discontinuity in a wave guide, comprises a pair of parallel rods symmetrically spaced in said guide and lying in a plane perpendicular to the direction of propagation of waves in said guide.

Fig. 1 represents a longitudinal cross-sectional view of a wave guide containing filtering discontinuities, taken perpendicular to the electrostatic lines for a TE$_{01}$ mode in said wave guide along the line 1—1 of Fig. 2;

Fig. 2 represents a transverse cross-sectional view of the wave guide structure shown in Fig. 1 taken along line 2—2 of Fig. 1; and Fig. 3 represents operating characteristics of the structure shown in Figs. 1 and 2.

Referring now to Fig. 1, there is shown a transmission line comprising a wave guide structure 10 shown here as having a rectangular cross section. However, it is to be clearly understood that any transmission line structure may be used in the practice of this invention. When this wave guide is excited in a well-known manner by electromagnetic waves at a frequency such that a TE$_{01}$ mode will be set up, the wider dimension 11 of the wave guide will be approximately six-tenths of the wave length used and the narrower dimension 12 will depend upon the amount of power to be transmitted by the wave guide.

Inside the wave guide structure 10 there is shown a plurality of rods 13 extending between the two wider surfaces of the wave guide perpendicular thereto. This configuration produces discontinuities having inductive susceptance since the rods are parallel to the electric field set up in a wave guide and, therefore, will have large currents induced therein. If the rods extended between the narrower sides of the wave guide perpendicular thereto, they would create discontinuities having capacitative susceptances since electrostatic lines would be set up between the rods and at wider sides of the wave guide as well as between the rods themselves. The use of these thin rods, whose diameter may be on the order of 5% of the desired operating wave length, permits the accurate installation thereof at any desired point in the wave guide. All that is necessary is to lay out the position of the ends of the rods upon the outside of the wave guide and then drill holes of the same diameter as the rods through the wave guide. The rods may then be inserted through the holes into the wave guide and firmly attached in place as, for example, by soldering. By this structure the rods may easily be inserted in the wave guide and indeed their effect on the wave guide may be finally adjusted after installation by slightly bending the rods by means of a pry bar inserted in the end of the wave guide. Furthermore, these rods offer little or no resistance to fluids and baths which may be introduced into the guide for coating or plating purposes.

As shown in Fig. 1, the rods are arranged in pairs, each pair of rods lying in a plane perpendicular to the axis of the wave guide, said rods being positioned symmetrically on either side of the wave guide axis to thereby create a discontinuity. The magnitude of the discontinuity may be varied by varying either the diameter of the rods or more simply by varying the distance between each of the rods of a pair. In general, the discontinuity decreasing with an increase of distance between the rods. Each pair of these rods thereby forms a discontinuity which may be adjusted, small tuning adjustments being accomplished by bending the rods subsequent to their installation. It has been discovered that, with the use of two discontinuities in a stage of a filter section, the spacing between the discontinuities at resonance will vary with the magnitude of the discontinuity.

By way of explanation, assume that the transmission line, shown here as wave guide 10, is a lossless line and terminated at its input and output of its characteristic impedance. If the discontinuity nearest the output is labeled $a$, the next nearest $b$, the next $c$ and the next $d$ and the discontinuities arranged into two pairs $a$—$b$ and $c$—$d$, analysis of the effect of the discontinuities may be made as follows. At point $a$, the normalized admittance looking towards the output will be $$Y_a = 1 + jB \quad (1)$$

where Y is the admittance, 1 is the normalized admittance of the termination and B is the normalized susceptance of the discontinuity, being negative for an inductive discontinuity and positive for a capacitative discontinuity. The normalized admittance looking toward the output from point $b$ will be the admittance at point $a$ transferred along the transmission line to $b$ plus the admittance at point $b$. This is given by the formula $$Y_b = \frac{1 + jB + jt}{1 + j(1+jB)t} + jB \quad (2)$$

where $$t = \tan \frac{2\pi s}{\lambda} \quad (3)$$

where $s$ equals the distance between discontinuities $a$ and $b$, and $\lambda$ equals the wave length of the desired operating frequency.

Resonance may be defined as the frequency at which there is no reflection from one stage of the filter, for example, the stage comprising discontinuities $a$ and $b$ when the filter section is terminated in its characteristic impedance. At resonance, therefore, the admittance looking into the stage $a$—$b$ toward the load must be equal to $Y_0$ where $Y_0$ is the normalized characteristic admittance of the transmission line and the terminating impedance, and by definition equals 1. Therefore, substituting 1 for $Y_b$ in Equation 2 and solving for $t$ results in $$t = \frac{2}{B} \quad (4)$$

Substituting the value $$\frac{2}{B}$$

for $t$ in Formula 3 and solving for $s$ results in a value of $$s = \left(\tan^{-1} \frac{2}{B}\right) \frac{\lambda}{2\pi} \quad (5)$$

Thus it may be seen that, for zero reflection from a filter stage at resonance, the spacing between the discontinuities varies as a function of the magnitude of said discontinuities, and more particularly is equal to the anti-tangent of twice the impedance of one of said discontinuities multiplied by a radian of the resonant filter wave length. A radian, as used in this specification and claims, is defined as a wave length $\div 2\pi$.

It may further be demonstrated that the spacing between the stages, for example, the stages $a$—$b$ and $c$—$d$, must vary as a function of the spacing between the discontinuities of each stage in order that the coupling between the stages be critical whereat a smooth band-pass characteristic is obtained.

At critical coupling, the distance between the stages must be such that there is an impedance match between the two stages of filter at and near the resonant frequency to which the filter is tuned. For example, if a point half way between the stages $a$—$b$ and $c$—$d$ be designated $h$, the value $Y_h$ looking toward the output will be equal to the value $Y_h$ looking toward the input. If critical coupling is to be obtained, the quantity $Y_h$ will be equal to its complex conjugate and so it follows that the value $Y_h$ must be a real number at and near resonance and, therefore, the slope of the curve of Equation 2 must be zero in this area.

If we rationalize and differentiate Equation 2, the result becomes $$\frac{dY_b}{d\lambda} = \frac{B^3 \frac{dt}{d\lambda} + 2B \frac{dB}{d\lambda}(-2+jB)}{B^2 + 4} \quad (6)$$

If the equation be multiplied through by $d\lambda_g$ and put into incremental form it becomes $$\Delta Y_b = \delta(-2+jB) \quad (7)$$

where $$\delta = \frac{B^3 dt + 2B dB}{B^2 + 4}$$

$\delta$ is the increment and is a small real quantity proportional to the frequency deviation from resonance.

Since at resonance the value of $Y_b$ is 1, at a point close to resonance the value is given by an equation $$Y_b + \Delta Y_b = 1 + \delta(-2+jB) \quad (8)$$

To obtain the variation of Y at point $h$, Equation 8 may be substituted in the transformation equation used for Equation 2 giving the following:

$$Y_h = \frac{1 + \delta(-2+jB) + j \tan \frac{2\pi \frac{M}{2}}{\lambda}}{1 + j[1 + \delta(-2+jB)] \tan \frac{2\pi \frac{M}{2}}{\lambda}} \quad (9)$$

where M is twice the distace from stage $a$—$b$ to point $h$, and equal to the distance between stages $a$—$b$ and $c$—$d$.

Since, as previously explained, $Y_h$ must be equal to a real number, the reactive component of Equation 9 may be equal to 0 and solved for M. The resultant formula becomes $$M = \frac{2\pi}{\lambda}\left(\tan^{-1} \frac{-B}{2}\right) \quad (10)$$

or since the value of a reactance transferred a quarter wave length along a transmission line is equal to the negative reciprocal of the reactance $$M = S \pm \frac{N}{4} \lambda \quad (11)$$

where N is an odd positive whole number.

Thus it may be seen that when the stages are separated by a distance which is different from the distance between the discontinuities of each stage by an amount equal to an odd number of of quarter wave lengths of the desired operating frequency, the stages are matched at and near the resonant frequency and critical coupling occurs with its resultant smooth band-pass characteristic.

Referring now to Fig. 3, there is shown a plot of the performance of this type of filter. Along the ordinate is plotted frequency in kilomegacycles. Along the abscissa is plotted the standing wave ratio in decibels. Curve 14 represents the characteristic response of one stage of the filter section, for example, the stage $a$—$b$. This curve is in the form of a V dropping sharply to 0 at resonance as shown by point 15 at a value of about 9 kilomegacycles and rising sharply in a straight line in either side thereof. Since standing wave ratio is, to a first approximation, an indication of the frequency response of the device, this curve shows that such a stage produces a sharp, narrow band-pass response curve. Curve 16 represents the characteristic of two stages, for example, $a$—$b$ and $c$—$d$, and shows that where these stages are correctly spaced as shown, for example, in Fig. 1 by a distance of M equal to $$S + \frac{\lambda}{4}$$

the band-pass is much broader and is in the form of a smooth curve having no objectionable humps in the center thereof. Thus it may be seen that there is provided herein a method of producing a two-stage filter section having a relatively wide smooth band-pass characteristic.

This completes the description of the particular embodiments of the invention illustrated herein. However, many modifications thereof will be apparent to persons skilled in the art. For example, many types of discontinuities may be used instead of the rods illustrated by applicant and several sections of filters may be added in series if desired. Therefore, applicant does not wish to be limited to the particular details of the invention as described herein except as defined by the appended claims.

What is claimed is:

1. A frequency responsive filter comprising a wave guide adapted to propagate electromagnetic wave energy and having a plurality of symmetrical pairs of discretely-spaced inductive post discontinuities therein, the posts of each discontinuity lying in a plane transverse to the axis of said guide and being symmetrically positioned with respect to said axis, the distance between the discontinuities of each pair being substantially equal to $$\frac{\lambda}{2\pi}\left(\tan^{-1}\frac{2}{B}\right)$$

where B is the normalized susceptance of one of said discontinuities, each of said discontinuities comprising a pair of parallel conducting members lying in a plane perpendicular to the direction of propagation of a wave in said wave guide and spaced substantially symmetrically on either side of the major axis of said guide spaced from a pair of opposite walls of said guide.

2. A frequency responsive filter comprising a wave guide adapted to propagate electromagnetic wave energy and having a plurality of symmetrical pairs of discretely-spaced inductive post discontinuities therein, the posts of each discontinuity lying in a plane transverse to the axis of said guide and being symmetrically positioned with respect to said axis, the distance between the discontinuities of each pair being substantially equal to $$\frac{\lambda}{2\pi}\left(\tan^{-1}\frac{2}{B}\right)$$

where B is the normalized susceptance of one of said discontinuities, the distance between said pairs of discontinuities being different from the distance between the discontinuities of each pair by an amount substantially equal to an odd number of quarter wave lengths of the desired operating frequency of said filter, each of said discontinuities comprising a pair of parallel deformable conducting members lying in a plane perpendicular to the direction of propagation of a wave in said wave guide spaced from a pair of opposite walls of said guide.

JOHN REED.

REFERENCES CITED

The following references are of record in the file of this patent:

UNITED STATES PATENTS

| Number | Name | Date |
|---|---|---|
| 2,432,093 | Fox | Dec. 9, 1947 |
| 2,540,488 | Mumford | Feb. 6, 1951 |